United States Patent [19]

Huber

[11] Patent Number: 5,134,674
[45] Date of Patent: Jul. 28, 1992

[54] REFLECTION COUPLING OF OPTICAL FIBERS

[75] Inventor: John H. Huber, Harrisburg, Pa.

[73] Assignee: AMP Incorporated, Harrisburg, Pa.

[21] Appl. No.: 446,271

[22] Filed: Dec. 5, 1989

[51] Int. Cl.⁵ .............................................. G02B 6/36
[52] U.S. Cl. .................................................... 385/61
[58] Field of Search ............... 350/96.18, 96.20, 96.22

[56] References Cited

U.S. PATENT DOCUMENTS

| | | | |
|---|---|---|---|
| 3,883,223 | 5/1975 | Hudson | 350/96.16 |
| 4,274,706 | 6/1981 | Tangonan | 350/96.19 |
| 4,329,017 | 5/1982 | Kapany et al. | 350/96.15 |
| 4,506,946 | 3/1985 | Hodge | 385/70 |
| 4,534,616 | 8/1985 | Bowen et al. | 350/96.20 |
| 4,583,820 | 4/1986 | Flamand et al. | 350/96.19 |
| 4,675,860 | 6/1987 | Laude et al. | 370/3 |
| 4,684,161 | 8/1987 | Egner et al. | 294/1.1 |
| 4,703,472 | 10/1987 | Blumentritt et al. | 370/3 |
| 4,717,233 | 1/1988 | Szkaradnik | 385/70 X |
| 4,718,744 | 1/1988 | Manning | 350/96.20 |
| 4,722,582 | 2/1988 | Modone et al. | 350/96.15 |
| 4,735,477 | 4/1988 | Bowen | 350/96.20 |
| 4,763,978 | 8/1988 | Courtney-Pratt et al. | 350/96.18 |

Primary Examiner—John D. Lee
Assistant Examiner—Robert E. Wise
Attorney, Agent, or Firm—Gerald K. Kita

[57] ABSTRACT

A connector assembly 1 for optical fibers 3, 3 comprising: a holder 2 for holding optical fibers 3, 3 such that light signals emanated from one of the optical fibers 3, 3 is transmitted into at least one other of the optical fibers 3, 3, a grip 21 at a rear of the holder 2, a passage 37 through the holder 2 permits flushing of contaminants, a cover 4 is applied on the holder 2 to prevent further contamination and to clamp the grip 21 on the optical fibers 3, 3 while the grip 21 is being held to grip 21 the optical fibers 3, 3.

13 Claims, 5 Drawing Sheets

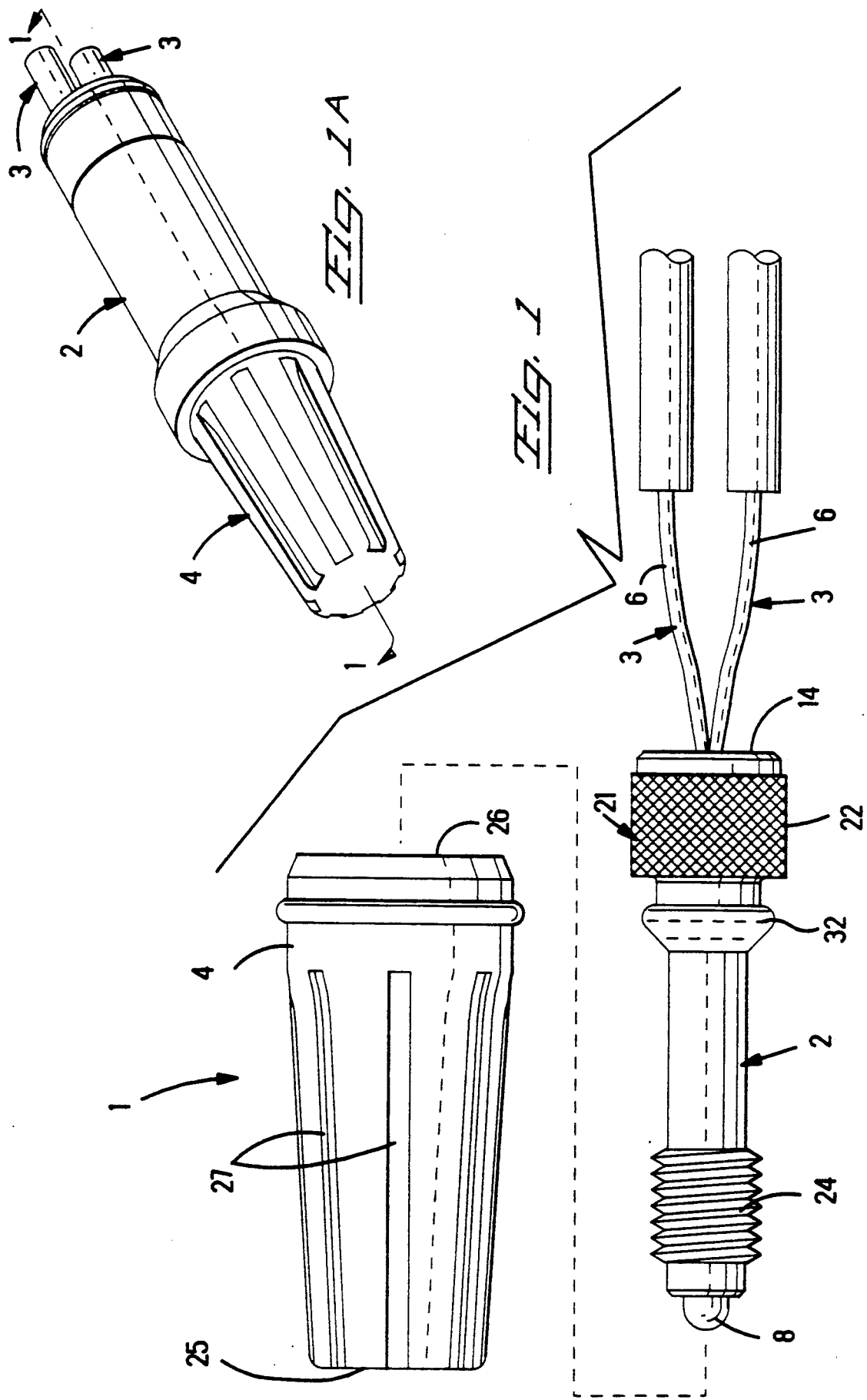

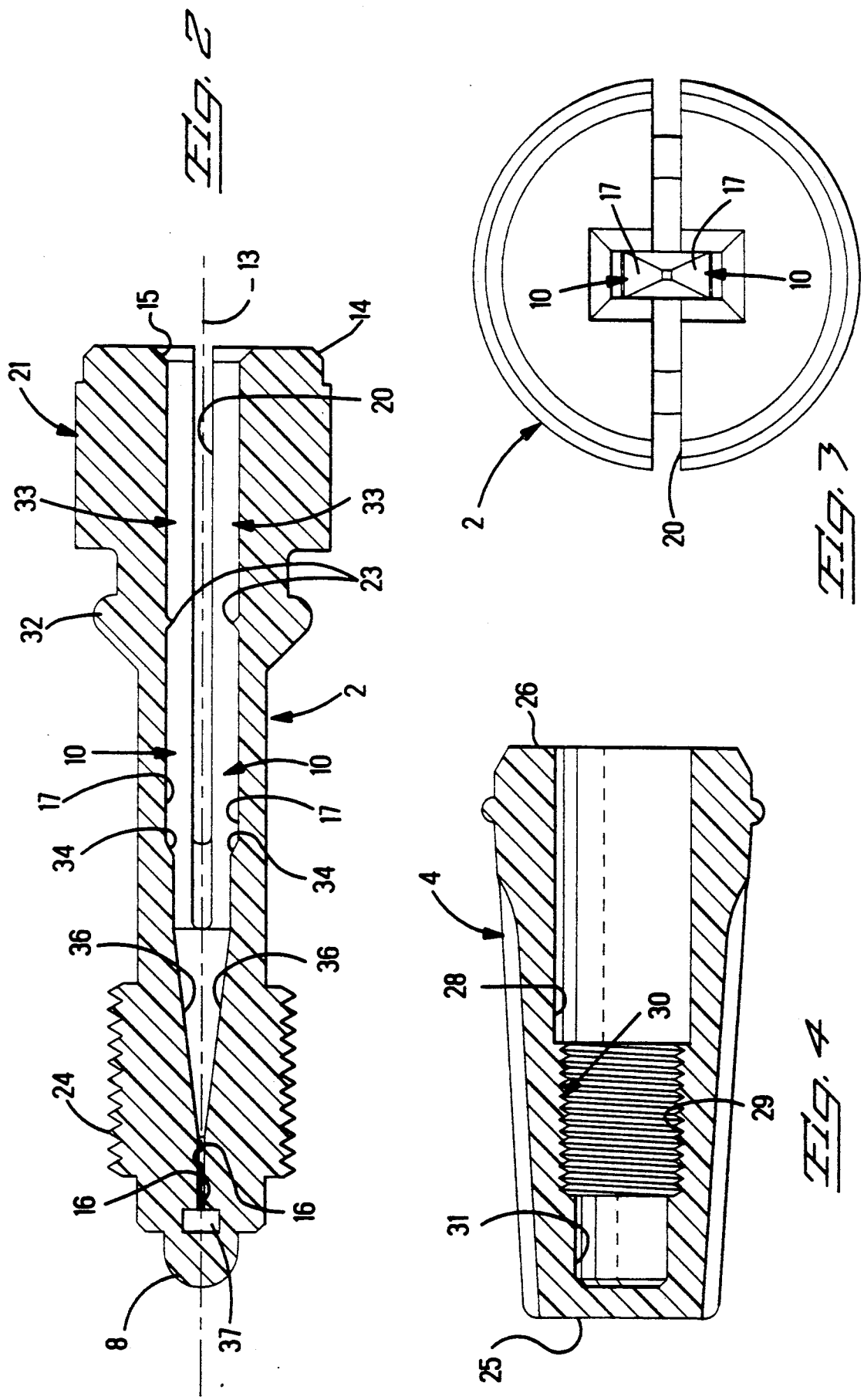

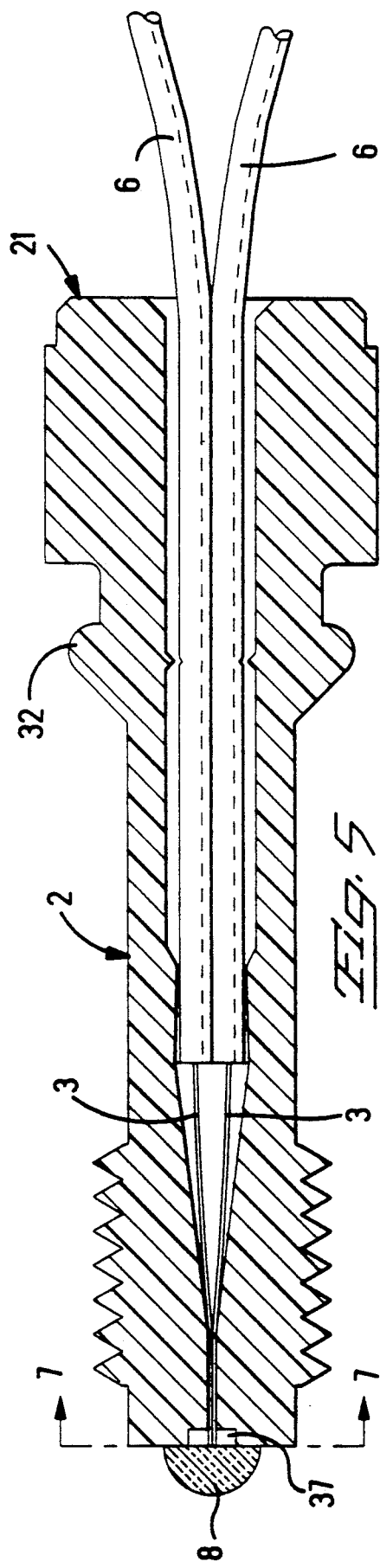
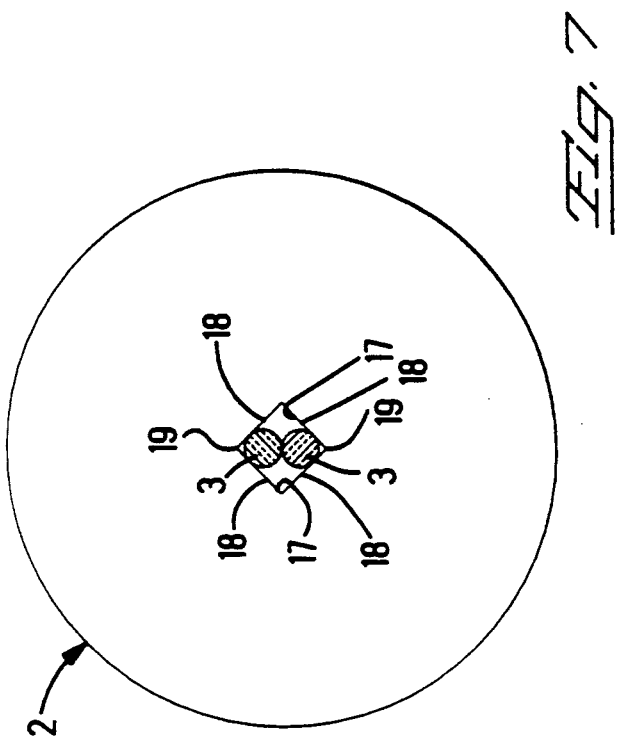
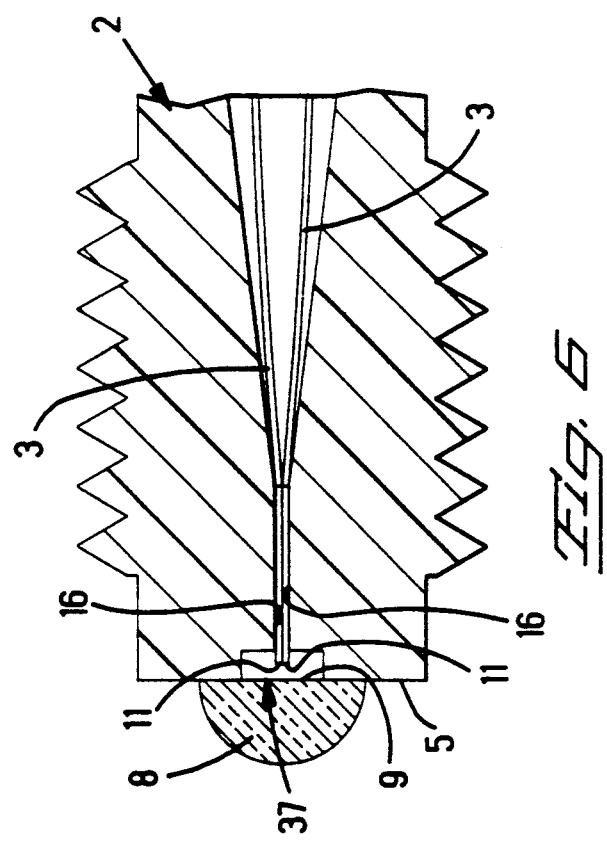
Fig. 5
Fig. 7
Fig. 6

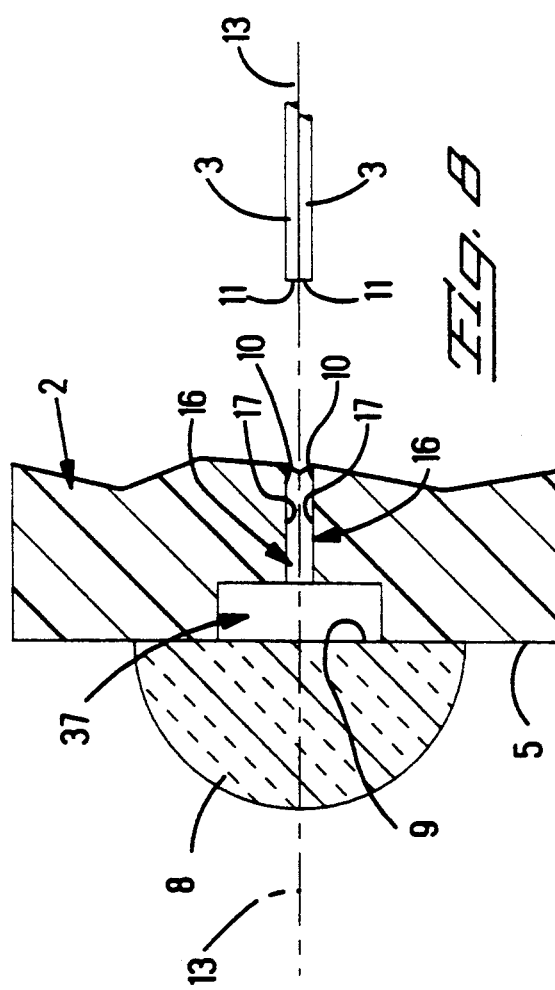
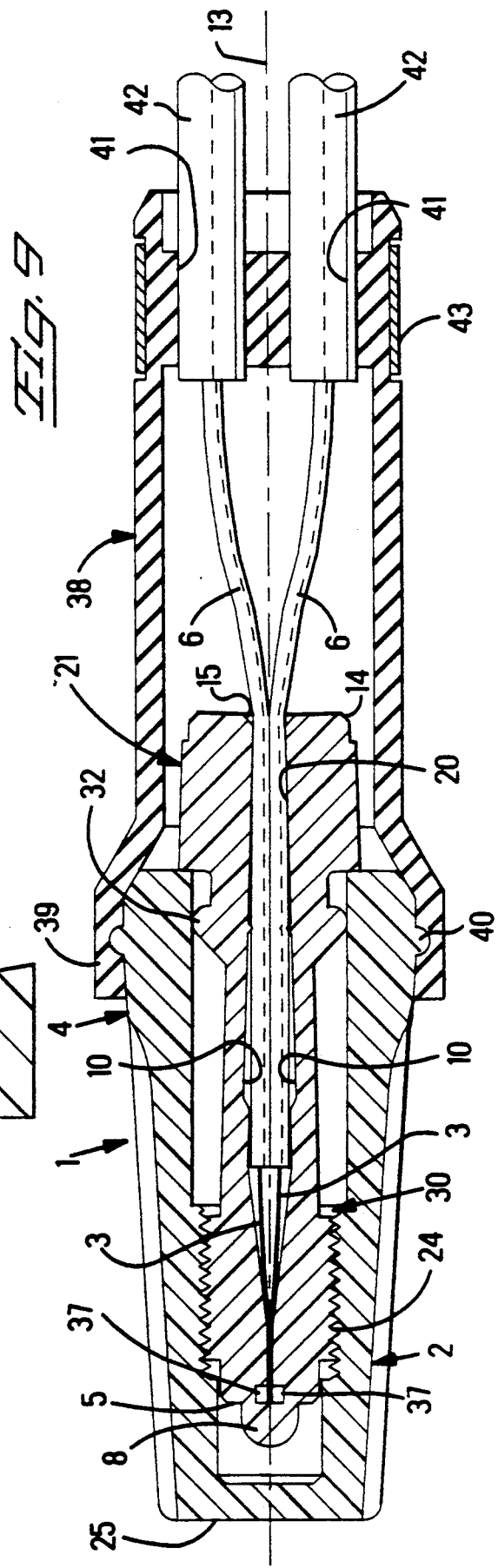

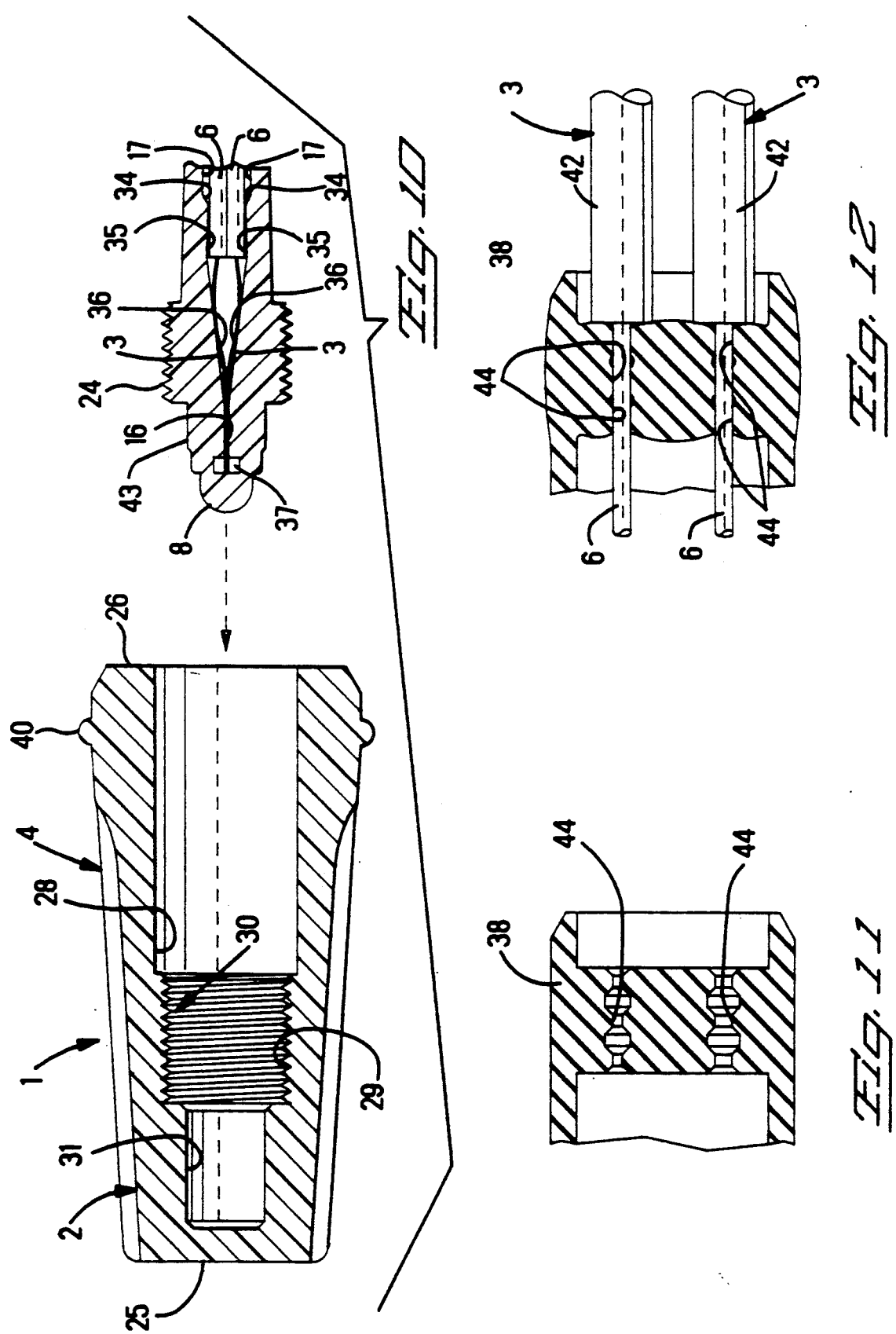

REFLECTION COUPLING OF OPTICAL FIBERS

FIELD OF THE INVENTION

The invention relates to a connector assembly for optical fibers, and more specifically to such a connector assembly having a mirror for coupling light signals from one optical fiber to at least one other optical fiber.

BACKGROUND OF THE INVENTION

Disclosed in each of U.S. Pat. No. 4,763,978 and U.S. Pat. No. 3,883,223 is a known connector assembly for optical fibers comprising: a holder for holding at least two optical fibers optically coupled such that light signals emanated from an end of one of the optical fibers is transmitted into an end of at least one other of the optical fibers. The known connector assembly further comprises, a holder for holding two or more optical fibers in front of a curved mirror such that light signals emanated from one of the optical fibers is reflected by the mirror into at least one other of the optical fibers. According to the disclosure of U.S. Pat. No. 4,763,978, the optical fibers are assembled into holes of the holder. Particles and other contaminants would fall to the bottoms of the holes, and would become interposed between ends of the optical fibers and the mirror to obscure light signals that are desired to emanate from or enter into the ends of the optical fibers. According to the disclosure of U.S. Pat. No. 4,735,477, optical fibers push debris into a slot that is always enclosed by cover members also that enclose the optical fibers. Although debris can move into the slot, the slot is enclosed and can not be flushed prior to covering the optical fibers and the mirror from further contamination. Accordingly, the debris remains as contamination in the slot, whether air or index matching gel fills the slot prior to covering the slot with the cover members. A need exists in the known connector assembly for a feature that will permit flushing contaminants prior to covering the optical fibers and the mirror from further contamination. A further need exists for a window to observe that the optical fibers are positioned properly for efficient optical coupling.

A disadvantage present in the known connector assembly results from the lack of a grip that will grip the optical fibers to hold them in place while a clamp is applied to close and clamp the fibers in place. Without a grip, the optical fibers can be dislodged from their desired positions while cover members, as in U.S. Pat. No. 4,735,477, are moved against the optical fibers to clamp them. In U.S. Pat. No. 4,763,978, no grip is provided to hold the optical fibers in place and preventing them from being dislodged while a threaded nut is driven to clamp them.

Another disadvantage results from a lack of assurance that the optical fibers will remain at precise locations from a transparent object, such as a curved mirror or another optical fiber, when dimensional changes occur with fluctuations in temperature.

According to the invention, a connector assembly for holding an optical fiber and a transparent object comprises, a holder for holding an end of an optical fiber against a transparent object, and the optical fiber is curved along its length to obtain inherent spring energy and impart pressure between the end of the optical fiber and a precisely located surface of the transparent object. The curvature of the optical fiber will change in response to dimensional changes of the holder and the transparent object with fluctuations in temperature, to retain pressure between the optical fiber and the surface. Thereby, the end of the optical fiber is maintained at a precise location, and the transparent object is maintained at a precise location.

SUMMARY OF THE INVENTION

An object of the invention is to provide a connector assembly for optical fibers that permits flushing of contaminants from the connector assembly. Another object of the invention is to provide a connector assembly that permits flushing of contaminants, and observing proper fiber positioning, followed by covering the connector assembly to prevent further contamination. According to a feature of the invention, each of the optical fibers is inserted along a corresponding cavity of the holder intersected at its forward end by a passage extending uncovered and through the holder along which contaminants are flushed from the cavity. The uncovered passage facilitates ease in flushing contaminants. Another feature of the invention resides in covering the passage to prevent further contamination. The uncovered passage allows visual inspection of the optical fibers and consequent readjustment or reuse of the holder when the optical fibers have been withdrawn.

Another object of the invention is to provide a connector assembly for optical fibers in which the optical fibers are in a holder, a grip at a rear of the holder is held, and a cover is applied on the holder to cover the ends of the optical fibers and to clamp the grip on the optical fibers while the grip is being held to grip the optical fibers. The grip is advantageous in allowing the optical fibers to be gripped and preventing the optical fibers from being dislodged even a slight amount as the cover is applied.

Another object of the invention is to provide a connector assembly that grips buffers on the optical fibers.

DESCRIPTION OF THE DRAWINGS

Reference will now be made, by way of example, to the accompanying drawings.

FIG. 1 is an perspective view with parts shown exploded of a connector assembly.

FIG. 1A is a perspective view of the connector assembly of FIG. 1.

FIG. 2 is a longitudinal section view of a holder of the connector assembly shown in FIG. 1.

FIG. 3 is an end elevation view of the holder.

FIG. 4 is a longitudinal section view of a cover of the connector assembly shown in FIG. 1.

FIG. 5 is a view similar to FIG. 2 showing optical fibers assembled in the holder.

FIG. 6 is a fragmentary view in section of the holder and illustrating optical fibers partially assembled in the holder.

FIG. 7 is a section view taken along the line 7—7 of FIG. 5.

FIG. 8 is a fragmentary view in section of the holder and optical fibers aligned with corresponding cavities of the holder.

FIG. 9 is a longitudinal section view of the connector assembly with optical fibers and a strain relief.

FIG. 10 is a fragmentary view similar to FIGS. 2 and 4, illustrating a modified holder and a modified cover.

FIG. 11 and 12 are fragmentary views similar to FIG. 9 and illustrating a different strain relief.

With more particular reference to FIG. 1, a connector assembly 1 includes a holder 2 for optical fibers 3, 3 and a cover 4 for assembly with the holder 2. As shown in FIG. 5, each of the optical fibers 3, 3 is buffer covered by an enlarged diameter, flexible buffer 6 that protects the light transmitting portion of the optical fiber 3.

With reference to FIGS. 2, 5 and 6, the holder 2 is a part fabricated, for example, by molding a plastics material, with a precisely located front end 5 on which is precisely located and positioned a mirror 7 of transparent material, a reflective surface 8 on the convex exterior of the mirror 7, and which is concave on the surface facing rearward, and a rear facing, flat, pressure surface 9 at a precise distance from the reflective surface 8. The pressure surface 9 intersects the center of curvature of the reflective surface 8 that is spheric, or intersects the focal point of the reflective surface 8 that is parabolic.

The mirror 7 is molded directly on the front end 5, FIG. 2, or is a separate part, FIGS. 5 and 6, assembled by adhesive joining the surface to the front end 5. Each optical fiber 3 is fully inserted along a corresponding cavity 10 of the holder 2 that intercepts the pressure surface 9. A front end 11 of the optical fiber 3 is urged forward to impinge the pressure surface 9 of the mirror 7, and to exert pressure against the surface 9. Pressure is desirable to hold the front end 11 of the optical fiber 3 at a precise distance and in precise alignment with respect to the curvature of the reflective surface 8.

The holder 2 holds at least two optical fibers 3, 3 optically coupled such that light signals emanating from an end 11 of one of the optical fibers 3, 3 is transmitted by reflection from the reflective surface 8 into an end 11 of at least one other of the optical fibers 3, 3. The ends 11, 11 of the optical fibers 3, 3 are in a planar array 12 parallel to the pressure surface 9, and having an axis 13 central to the array 12, FIG. 8. The reflective surface 8 is symmetrical about the axis 13 to insure coupling of light signals from one optical fiber 3 to each other optical fiber 3 in the array 12. The axis 13 intersects the focal point of either a spheric reflective surface 8 or a parabolic reflective surface 8. The axis 13 intersects the center of curvature of a spheric reflecting surface.

Each of the optical fibers 3, 3 is inserted along a corresponding cavity 10 extending from a rear end 14 of the holder 2 to the front end 5. The corresponding cavity 10 is enlarged at the rear end by a sloped funnel surface 15, FIG. 2, to help funnel the optical fiber 3 into the corresponding cavity 10.

The corresponding cavity 10 includes a reduced section 16 parallel to the axis 13 of the array 12 and with the open side intercepting laterally the axis 13. An interior surface 17 of the corresponding cavity 10 along the reduced section 16 laterally engages and positions the uncovered optical fiber 3 in the array 12. As shown in FIGS. 2, 3 and 7, the corresponding cavity 10 is rectangular in cross section with an open side facing the array 12 and facing the axis 13 of the array 12. The interior surface 17 has converging sides 18, 18, FIG. 7, that converge at a corner 19 of the rectangular cross section. Each corresponding cavity 10, along its open side, joins each other corresponding cavity 10 to support corresponding optical fibers 3, 3 against one another. The optical fibers 3, 3 engage one another laterally to bias each of the optical fibers 3, 3 in abutment against the corresponding interior surface 17. In the reduced section 16, the optical fibers 3, 3 engage one another to bias each of the optical fibers 3, 3 in abutment against the converging sides 18, 18 of the corresponding cavity 10. The converging sides 18, 18 laterally engage the optical fiber 3 and position the optical fiber 3 precisely parallel to the other optical fibers 3, 3 in the array 12 and precisely aim each optical fiber 3 along a desired direction toward the reflective surface 8.

As the optical fibers 3, 3 are inserted along the sides 18, 18, they skive into the sides 18, 18 and become indented at least partially into the sides 18, 18. This provides a distinct advantage of a tight fit of the optical fibers 3, 3 along the reduced section 16, because skiving eliminates a loose fit due to variations in dimensional tolerances. The material of the sides 18, 18 can be resiliently deformable when compressed laterally against the optical fibers 3, 3, also to eliminate a loose fit and provide a tight fit. A tight fit is also achieved by compressing the material of the sides 18, 18 laterally against the optical fibers 3, 3 and the optical fibers 3, 3 resiliently deform and indent the sides 18, 18.

With reference to FIGS. 2 and 5, a longitudinally extending 20 gap divides at least a rear portion of the holder 2. The open side of the corresponding cavity 10 faces, across the gap 20, an open side of at least one corresponding cavity 10 receiving at least one other of the optical fibers 3, 3. The gap 20 is closed to clamp the optical fibers 3, 3 and maintain them impinged against the pressure surface 9. See FIG. 6.

A grip 21 provided on the rear end 14 of the holder 2 includes an exterior knurling 22. The grip 21 is divided by the gap 20, and the gap 20 is closed by deflecting divided parts of the grip 21 toward each other. The grip 21 is held by hand to close the gap 20 and grip 21 the buffer covered optical fibers 3, 3. The buffers 6 encircling the optical fibers 3, 3 extend along the gap 20, and the gap 20 is closed to clamp the buffers 6 and the optical fibers 3, 3. An interior gripping surface 23 is provided by a barb projecting from the side of the corresponding cavity 10, and engages and grips a corresponding buffer 6 when the gap 20 is closed by being held. The optical fibers 3, 3 are gripped by the closed grip 21 while ends of the optical fibers 3, 3 are being biased by the holder 2 against the pressure surface 9. Gripping the optical fibers 3, 3 prevents movement of the optical fibers 3, 3 away from the pressure surface 9 and prevents dislodging of the ends of the optical fibers 3, 3 from abutment with the mirror 7.

While the grip 21 is being held, the cover 4 is assembled onto the holder 2. The holder 2 at the front end 5 is provided with helical threads 24 extending toward the rear end 14. The cover 4, FIGS. 1 and 4, has a closed front end 25, a series of circumferentially spaced apart flutes 27 at the front end 25, and an open rear end 26. A recess 28 extends from the rear end 26 and has a smooth side surface near the rear end 26, a reduced diameter portion 29 with internal threads 30 spaced from the rear end 26, and a smaller bottom portion 31 near the front end 25. The cover 4 is installed on the holder 2 by advancing the threads 30 of the cover 4 along the threads 24 of the holder 2. The cover 4 covers the reflective surface 8, the pressure surface 9 and the ends of the optical fibers 3, 3 from further contamination. The holder 2 has an external radially projecting, forward sloped collar 32 forward of the grip 21. The recess 28 of the cover 4 is advanced over the collar 32. The interior of the cover 4 radially presses the collar 32 inward to close further the grip 21 and to clamp the buffer covered optical fibers 3, 3 and to retain the grip 21 in closed position. The grip 21 no longer needs to be held closed.

The corresponding cavity 10 converges toward the axis of curvature and the axis 13 of the array 12. An interior surface 17 of the corresponding cavity 10 is stepped to provide the corresponding cavity 10 with a stepped cross section. The corresponding cavity 10 has, an enlarged rear section 33 larger than the cross section of a corresponding buffer 6 to receive loosely the buffer covered optical fiber 3, and an inwardly and forwardly sloped section 34 to funnel a corresponding buffer 6 into a narrower section 35 along which the interior surface 17 laterally supports and engages a corresponding buffer covered optical fiber 3. The narrower section 35 urges the buffers 6, 6 laterally impinged against one another in a compact bundle. The corresponding cavity 10 further includes a converging section 36 along which the interior surface 17 laterally engages and supports the optical fiber 3 that projects outward from the corresponding buffer 6 and is uncovered by the corresponding buffer 6.

Each optical fiber 3 extends along the portion or section 35 of a corresponding cavity 10 of the holder 2, the corresponding end 11 extends along the portion or section 16 of the corresponding cavity 10, the axis of which is offset axially from the axis of the portion or section 35, and a curved portion 3A of the optical fiber 3, FIGS. 6 and is curved within the corresponding cavity 10 and is laterally supported by a side or interior surface 17 of the corresponding cavity 10.

Each optical fiber 3 is projected forwardly toward and against the pressure surface 9, such that pressure is exerted between an end 11 of each optical fiber 3 and the pressure surface 9. The pressure causes the curved portion 3A of the optical fiber 3 to bend laterally with a smooth curvature, and to store internal inherent spring energy. The curved length of each optical fiber 3 from the section 16 to the front end of the holder 5 and to the pressure surface 9 is greater than a straight line span of distance to the front end of the holder 5 and to the pressure surface 9. Thus, the stored energy of the curved optical fiber 3 will exert or impart continuous spring pressure between the end 11 of the optical fiber 3 and the pressure surface 9, as the span of distance shrinks or lengthens due to expansion and contraction of the materials with variations in temperature.

To maintain the pressure, the interior surface 17 along the converging section 36 laterally supports the corresponding optical fiber 3, FIG. 6, to limit further lateral deflection of the optical fiber 3, and further tends to support the curved optical fiber 3 laterally while the buffer 6 is being gripped. The gripped optical fiber 3 remains stationary, and tends to be straightened by being supported by the surface 17, thereby urging the end 11 of the optical fiber 3 forward to apply pressure to the pressure surface 9.

FIG. 9 shows a unitary, sleeve form boot 38 slid axially forward of the optical fibers 3, 3 with an open front end 39 slid forwardly and resiliently snapped over an external lip 40 on the holder 2 at the rear end. Passages 41, 41 encircle corresponding jackets 42, 42 encircling corresponding buffers 6, 6. A metal compression ring 43 is radially deformed to apply gripping pressure between the boot 38 and the jackets 42, 42, thereby providing a strain relief for the optical fibers 3, 3.

With reference to FIGS. 2, 5 and 6, a transverse passage 37 extends through opposite sides of the holder 2, and intercepts a front end of the corresponding cavity 10, and intercepts the pressure surface 9. The front ends 11, 11 of the optical fibers 3, 3 are intercepted by the passage 37, prior to full insertion of the optical fibers 3, 3 against the pressure surface 9. Fluid pressure, such as, air pressure, is directed through the passage 37 to flush contaminants from each front end 11, 11, the corresponding cavity 10 and the pressure surface 9, prior to assembling the cover 4 onto the holder 2 to cover 4 the passage 37, the reflective surface 8, the pressure surface 9 and the ends of the optical fibers 3, 3, and prevent further contamination. A source of fluid pressure is obtained, for example, from a commercially available canister, not shown, of clean, compressed air. By directing a nozzle of the canister toward the passage 37, the nozzle will deliver air under pressure through the passage 37 to flush contaminants. Subsequently, the optical fibers 3, 3 are fully inserted to impinge the pressure surface 9. They are observed by visual inspection along passage 37 to be positioned properly, and can be repositioned if necessary.

With reference to FIG. 10, the holder 2 is modified with a resiliently compressible section 43 concentric with the reduced section 16 of each corresponding cavity 10, and positioned between the threads 24 and the end 5 of the holder 2. The holder is fabricated from a resiliently deformable plastic material, and the section 43 is fit compressibly along a portion 31 of the recess 28 that has an interior diameter less than the exterior diameter of the section 16. When the threads 30 of the cover 4 is advanced along the threads 24 of the holder 2, the section 43 is compressibly inserted along the portion 31 of the recess 28, causing the reduced section of each corresponding cavity 10 to compress laterally and indent the sides 18, 18 against the corresponding optical fibers 3, 3. Thereby clearances are eliminated, that would have been present between each of the optical fibers 3, 3 and the corresponding cavity 10, due to variations in dimensional tolerances.

With reference to FIG. 11, the boot 38 is modified with multiple, spaced apart, annular ridges 44 projecting radially inward from an interior surface of each corresponding passage 41. The boot 38 is fabricated of a resiliently compressible material, for example, an elastomeric material, enabling the ridges to be slid along a corresponding buffer 6 of an optical fiber 3 and become indented and compressed against the buffer 6 of a corresponding optical fiber 3 located compressibly along the corresponding passage 41. Thereby, a strain relief is provided for gripping each optical fiber 3.

Each of the discussed advantages, features and objectives of the disclosed invention exists independently and contributes to the use and importance of the invention.

I claim:

1. A connector assembly for optical fibers comprising: a holder for holding at least two optical fibers, said optical fibers being optically coupled such that light signals emanating from an end of one of the optical fibers are transmitted into an end of at least one other of the optical fibers, and the ends of the optical fibers are intercepted by a transverse passage extending uncovered and through the holder along which contaminants are flushed from the passage.

2. A connector assembly as recited in claim 1, further comprising: a cover assembled onto the holder and covering the passage to prevent further contamination.

3. A connector assembly as recited in claim 1, wherein the improvement comprises: a grip surface on the interior of the holder engaging buffers encircling the optical fibers.

4. A connector assembly as recited in claim 1, wherein the improvement comprises: a gap dividing at least a rear portion of the holder, and the corresponding cavity receiving one of the optical fibers facing across the gap the corresponding cavity receiving at least one other of the optical fibers, and the gap being closed to clamp the optical fibers.

5. A connector assembly as recited in claim 4, wherein the improvement comprises: buffers encircling the optical fibers and extending along the gap, and the gap being closed to clamp the buffers and the optical fibers.

6. A connector assembly as recited in claim 4, further comprising: a grip on the rear portion of the holder divided by the gap, and the gap being closed by deflecting divided parts of the grip toward each other.

7. A connector assembly as recited in claim 1, wherein the holder has cavities corresponding to the optical fibers, each corresponding cavity converges toward an axis of curvature of a reflective surface of a mirror reflecting light signals into the end of said at least one other optical fiber.

8. A connector assembly as recited in claim 7 wherein: the optical fibers engage one another to bias each of the optical fibers in abutment against an interior surface of the corresponding cavity.

9. A connector assembly as recited in claim 7, wherein: each corresponding cavity joins each other corresponding cavity to support corresponding optical fibers against one another.

10. A connector assembly as recited in claim 7, further comprising: an interior surface of the corresponding cavity engaging a corresponding buffer encircling an optical fiber inserted along the corresponding cavity, and the interior surface of the corresponding cavity laterally supporting a corresponding optical fiber to apply pressure of the end of the corresponding optical fiber against the pressure surface.

11. A connector assembly as recited in claim 7, wherein the ends of the optical fibers impinge against a pressure surface at a precise distance from a reflective surface of the mirror, and the holder includes an interior surface against which the optical fibers are supported to apply pressure between the ends and the pressure surface.

12. A connector assembly as recited in claim 11, wherein: the pressure surface is on a rear facing surface of the mirror, the reflective surface is on a front of the mirror, and the rear facing surface is intercepted by the passage.

13. A connector assembly as recited in claim 7, further comprising: an interior surface of the corresponding cavity engaging a corresponding buffer encircling an optical fiber inserted along the corresponding cavity, and the interior surface of the corresponding cavity laterally supporting a corresponding optical fiber to apply spring pressure of the end of the corresponding optical fiber against the pressure surface.

* * * * *